United States Patent [19]

Peter et al.

[11] 4,235,573
[45] Nov. 25, 1980

[54] DOUBLE ACTING HUB-TO-SHAFT CLAMP CONNECTION

[75] Inventors: Oskar E. Peter, 7129 Schloss-Str. 9,/1, Brackenheim, Fed. Rep. of Germany; Lothar Peter, Güglingen, Fed. Rep. of Germany

[73] Assignee: Oskar E. Peter, Brackenheim, Fed. Rep. of Germany

[21] Appl. No.: 116,309

[22] Filed: Jan. 28, 1980

[30] Foreign Application Priority Data

Sep. 28, 1979 [DE] Fed. Rep. of Germany ....... 2939261

[51] Int. Cl.³ .................................................. F16D 1/06
[52] U.S. Cl. ........................................ 403/13; 403/370
[58] Field of Search ............... 403/370, 371, 374, 368, 403/366, 12, 13, 14

[56] References Cited

U.S. PATENT DOCUMENTS

| | | | |
|---|---|---|---|
| 3,679,247 | 7/1972 | Peter et al. | 403/366 |
| 3,847,495 | 11/1974 | Peter et al. | 403/370 |
| 3,849,015 | 11/1974 | Peter et al. | 403/368 X |

FOREIGN PATENT DOCUMENTS 7000272 9/1970 Fed. Rep. of Germany .

*Primary Examiner*—Andrew V. Kundrat
*Attorney, Agent, or Firm*—Frishauf, Holtz, Goodman & Woodward

[57] ABSTRACT

To permit accurate centering by means of compression rings which are pressed against conical surfaces of a tubular element inserted in the hub, and a sleeve with conical surfaces placed on the shaft, the compression rings are formed with axial centering ring extensions which, at their inner and outer surfaces engaging the hub, and the shaft, respectively, are bowed or curved in cross-section to be, for example, at least approximately part-spherical. Sequential tightening of bolts to draw the compression rings together and the respective conical surfaces over each other thus will not result in misalignment of the compression rings, or tilted or slanted bindings thereof with respect to the hub, or shaft, respectively, but insure accurate positioning of the compression rings, with the centering extensions around the shaft and within the hub.

10 Claims, 3 Drawing Figures

DOUBLE ACTING HUB-TO-SHAFT CLAMP CONNECTION

The present invention relates to a clamping connection to clamp a hub to a shaft which is capable of transmitting high torsional forces and which provides for accurately centered positioning of the hub on the shaft.

Double-acting clamping connections have previously been proposed. German Gebrauchsmuster No. 70 00272 discloses such a connection in which a sleevelike element which is fitted around the shaft has outer conical surfaces which taper from an enlarged central portion to thin outer end portions. The hub is fitted with an outer tubular element which has inner conical surfaces, facing the outer conical surfaces of the shaft and tapering from an enlarged central portion to thin outer end portions. The relative dimensions of the outer element and the inner element, and the respective conical surfaces are so arranged that gaps are formed between the respective surfaces. These gaps are filled with oppositely facing compression rings which are inserted between the respective conical surfaces of the inner and the outer element. The compression rings are formed with conical surfaces which at least approximately match the conical surfaces of the inner and outer elements and bolts are passed through openings in one compression ring and tapped holes in the other, so that, upon drawing the compression rings together, the conical surfaces will slidingly engage and provide tight clamping forces with accurate centering of the hub and of the shaft.

To improve the centering, the clamping rings additionally are formed with cylindrical projections which form centering rings. The clamping bolts typically are arranged in planetary positions around the circumference of the centering rings, for example 6, 8 or 12, and, for tightening, it is customary to tighten the bolts, sequentially tightened bolts being located essentially diammetrically with respect to previously tightened ones, since it is practically impossible to tighten several, or all, at one time.

In actual practice, it has been found that by sequential tightening of the planetary bolts—which is practically the only way the connection can be made by one operator—the centering rings may have the tendency to tilt, and jam against either the hub, or the shaft, or both. Such additional, off-center tilted engagement of the centering ring with the hub, or the shaft, or both, changes the forces required to tighten the clamping bolts and the normal tightening forces which, for example, are subject to design values and can be set by a mechanic with a torque wrench, will not truly reflect the tightening force which is being applied between the centering rings themselves. Additionally, excessive tilt which may occur if, for example, the connection is installed by an unskilled operator may result in out-of-round running condition of the hub with respect to the shaft.

THE INVENTION

It is an object to improve the hub-to-shaft connection described aforesaid and which permits ready installation, even by unskilled, or careless operators, without interfering with the advantages of the connection such as uniformity of clamping force, ease of centricity, and true running with high axial loading, and torque transmission.

Briefly, the centering ring portions of the compression rings which extend axially are formed with inner and outer tangential engagement surfaces which are bowed or curved, in cross-section, for example are part spherical. Changing the cross-sectional shape of the centering rings has the additional advantage that a simple modification permits sealing the space between the hub and the shaft to prevent ingress of dirt, dampness, moisture, foreign particles or the like within the interior of the clamping connection, and thereby accurately seal the hub to the shaft; loss of lubricant from any bearings positioned behind the hub is thus prevented, and ingress of contaminants which might interfere with proper running of the shaft in bearings or lubrication thereof is likewise effectively prevented, thus substantially increasing the lifetime and operating reliability of other equipment associated with the shaft and the hub. The arrangement can also be easily modified or used for special machinery, for example used in the chemical industry, by making the compression rings of suitable metal, or suitably treating the engagement surface portions, for example to be resistant to acids, or other corrosive or detrimental chemicals which might attack an engagement connection of a shaft and a hub.

The arrangement has the specific advantage that, upon tightening the connecting bolts sequentially, the centering rings permit slight relative tilting similar to tilting of a universal joint element without, however, binding with, or biting into surrounding metal of the hub, or of the shaft, respectively. The overall torque transmission capability of the connection is increased since the forces which press the conical surfaces of the sleeve and the tube into engagement with the compression rings can be accurately determined and increased, with no force being required to overcome undesired tilted engagement with either the hub, or the shaft of the centering rings. Since the centering rings have bowed, preferably part circular, that is, generally part spherical outer shape, the overall accuracy of centricity between the hub and the shaft is improved.

DRAWINGS

Figure 1:
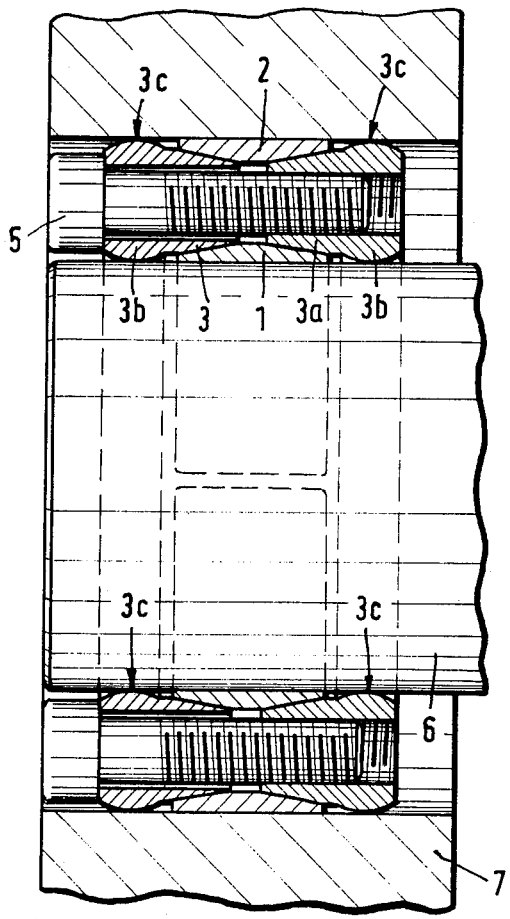
FIG. 1 is a cross-sectional view through the hub-to-shaft connection in engaged position.
Figure 2:
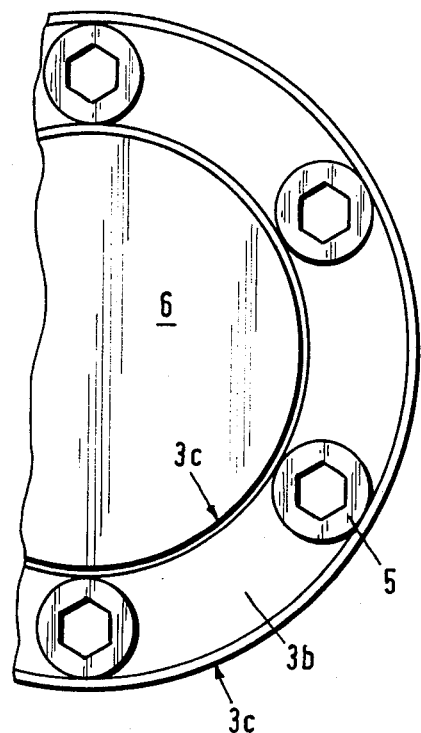
FIG. 2 is a fragmentary end view of the connection.

The hub-to-shaft connection of FIGS. 1 and 2 comprises an axially slit inner ring 1 having oppositely directed outer conical surfaces. Radially spaced therefrom is an axially slit tubular element 2, fitted into the hub 7. Compression rings 3,3a are located between the sleeve 1, which surrounds the shaft 6, and the tube 2, which is fitted within the hub 7. The compression rings 3,3a are formed with conical surfaces which match the conical surfaces on the sleeve 1 and the ring 2, respectively, or at least approximately match the cone surfaces. The rings 3,3a extend beyond the region of the conical surfaces to form centering extension rings 3b.

In accordance with the present invention, the centering rings 3b have outer and inner axially bowed, or curved—in cross-section—surfaces 3c, which make the surfaces part spherical. A hub is assembled to a shaft, for example, by first placing the ring 3a between the hub and the shaft; then placing the sleeve 1 and the ring 2, loosely therebeneath and thereover, and then placing the ring 3, as shown in FIG. 1. Thereafter, bolts 5 with Allen heads are screwed into matching tapped bores in ring 3a, passing freely through slightly larger bores in the ring 3.

The bolts 5 are tightened by means of a torque wrench, one after the other, in crossed sequence to a predetermined torque force, thus drawing the rings 3,3a against each other and pressing the conical surfaces of the sleeve 1 and the tube 2 away from the rings 3,3a and effecting a tight, centered connection between the shaft 6 and the hub 7. The double-conical rings 3,3a, with the centering rings 3b with outer surfaces 3c thereon, then press the respective ring 1 and the tube 2 on the shaft 6 and against the bore in the hub 7. Slight movement of the respective sleeve and ring is possible due to the axial slit therein, as seen in FIG. 1. The tightened connection permits transfer of substantial torque forces.

The connection can readily be loosened by removing the bolts 5 and replacing them with press-off bolts, as well known in release of hubs from shafts.

Figure 3:
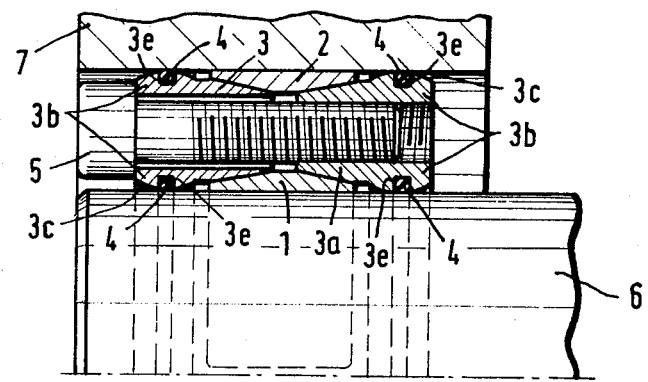
FIG. 3 is a fragmentary view of half of the connection shown in FIG. 1, to a different scale, and illustrating a modification including sealing elements.

FIG. 3 illustrates an arrangement in which the surfaces 3c on the centering rings 3b of the compression rings are formed with grooves 3e in which sealing rings 4 are located. The sealing rings may, for example, be rubber, or plastic O-rings, or the like. In all other respects, the embodiment of FIG. 3 is similar to that previously described. The sealing rings effectively seal the right side (FIG. 3) of the hub-to-shaft connection from the left, or accessible side, and thus prevent contamination of any elements at the right side of the connection, for example bearings supporting the shaft 6, due to the presence of contaminants at the left side of the connection. The centering ring portions 3b of the compression rings 3,3a can have surfaces which are treated to be chemically resistant, or otherwise the entire rings may be made of material which is selected to resist corrosive, or other fluids as desired, e.g. be of acid resistant steel, hard steel, steel with a hardened surface, or the like.

We claim:

1. Double acting hub-to-shaft clamp connection having
   an inner, sleevelike element (1) adapted to fit around a shaft (6) and having outer conical surfaces tapering from an enlarged central portion to thinner outer end portions;
   an outer tubular element (2) adapted to fit within the hub (7) and having inner conical surfaces tapering from an enlarged central portion to thinner outer end portions,
   the relative dimension of the outer element and the inner element being so selected as to leave a gap therebetween;
   oppositely facing compression rings (3,3a) inserted in the gap between the conical surfaces of the inner and the outer elements (1, 2), said compression rings being formed with conical surfaces at least approximately matching the conical surfaces of said inner and outer elements,
   said compression rings being formed with centering ring portions (3b) at the outer regions thereof remote from said conical surfaces;
   and means (5) to draw said compression rings towards each and engage the conical surfaces thereof with the conical surfaces of said inner and outer elements (1,2),
   wherein,
   the centering portions (3b) of the compression rings comprises inner and outer engagement surfaces (3c) dimensioned to engage the inner surface of the hub (7) and the outer surface of the shaft (6), said engagement surfaces being curved in axial cross-section to provide floating self-seating tangential engagement thereof with the shaft, and the hub, respectively.

2. Double acting hub-to-shaft clamp connection according to claim 1, wherein the engagement surfaces (3c) of the centering ring portions (3b) are essentially part spherical.

3. Double acting hub-to-shaft clamp connection according to claim 1, wherein the curved engagement surfaces (3c) of the centering ring portions (3b) are formed with circumferential grooves (3e);
   and sealing rings (4) located in said grooves.

4. Double acting hub-to-shaft clamp connection according to claim 3, wherein said sealing rings comprise a material which is resistant to contaminants and includes at least one of the materials selected from the group consisting of: rubber; plastic.

5. Double acting hub-to-shaft clamp connection according to claim 3, wherein the compression rings comprise an acid resistant, corrosion resistant material.

6. Double acting hub-to-shaft clamp connection according to claim 5, wherein the engagement surfaces (3c) of the centering ring portions (3b) are essentially part spherical.

7. Double acting hub-to-shaft clamp connection according to claim 1, wherein the compression rings comprise an acid resistant, corrosion resistant material.

8. Double acting hub-to-shaft clamp connection according to claim 1, wherein at least the engagement surfaces (3c) of the curved centering ring portions (3b) of the compression rings (3,3a) are corrosion resistant.

9. Double acting hub-to-shaft clamp connection according to claim 1, wherein at least the centering ring portions (3b) having the curved engagement surfaces (3c) of the compression rings (3,3a) are made of acid resistant steel.

10. Double acting hub-to-shaft clamp connection according to claim 9, wherein the curved engagement surfaces (3c) of the centering ring portions (3b) are formed with circumferential grooves (3e);
    and sealing rings (4) located in said grooves;
    wherein the engagement surfaces (3c) of the centering ring portions (3b) are essentially part spherical.

* * * * *